March 15, 1966    W. TRAUT ETAL    3,240,923
REFLECTOR FOR FLASH GUNS
Filed March 11, 1963

3,240,923
REFLECTOR FOR FLASH GUNS
Walter Traut, Stuttgart-Mohringen, and Otto Vierling, Sindelfingen, Germany, assignors to Zeiss Ikon Aktiengesellschaft, Stuttgart, Germany
Filed Mar. 11, 1963, Ser. No. 264,102
Claims priority, application Germany, Mar. 16, 1962, Z 9,296
2 Claims. (Cl. 240—1.3)

The invention relates to a cup-shaped reflector, preferably used for flash guns.

It is an object of the invention to provide a cup-shaped reflector for flash guns which has the required axial length or depth to sufficiently illuminate the object to be photographed by a stream of light produced by the flash bulb which is fired by the flash gun. The reflectors used for this purpose have a certain axial length or depth which is too great for storing the reflector, when not in use, in a relatively small space, such as a small casing which can be conveniently carried in a suit pocket or in the cover of a camera carrying case.

In accordance with an important object of the invention the cup-shaped reflector is made of a rubber-elastic material so that the reflector, when not in use, may be in part rearwardly inverted at its open end or may be axially compressed into an accordion-like shape in order that the inverted or compressed reflector may be stored in a relatively small space.

For the purpose of producing a sufficient reflective power, at least the concave reflective surface of the reflector according to the invention is made white or is metallically dyed.

Figure 1:
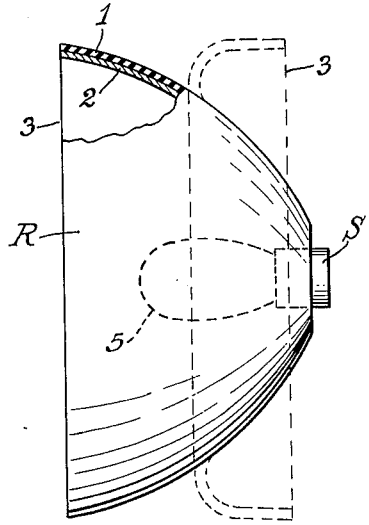
Figure 2:
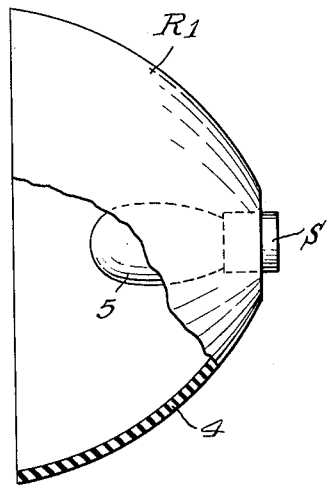
Figure 3:
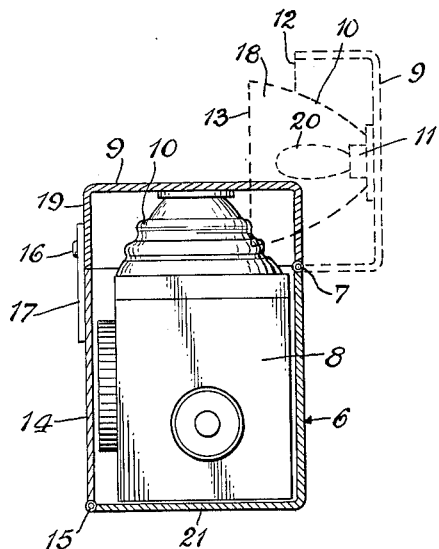

With these and other objects in view, as will appear hereinafter, the invention will now be described in greater detail with reference to the accompanyinng drawings, in which:

FIG. 1 is a side elevation view of one embodiment of a reflector with a portion of its wall broken away, FIG. 2 is a similar view as FIG. 1 of another embodiment of the reflector, and FIG. 3 illustrates in a sectional view a camera carrying case with a camera therein and a reflector in accordance with the invention in the cover of the carrying case.

Referring to FIG. 1, the cup-shaped reflector R is provided with a wall 1 made from a rubber-elastic material. The inner concave surface of this wall 1 is provided with a reflective layer 2 preferably comprising a metallized fabric made of glass fibers or asbestos fibers. This fabric may be cemented or vulcanized to the wall 1.

FIG. 2 illustrates another embodiment of the invention in which the entire wall structure 4 of the cup-shaped reflector $R_1$ consists of a rubber-elastic material which is suitably metallically dyed to produce the desired reflective property.

The shape of both these embodiments may be changed or intentionally distorted from their operative positions as shown in the FIGS. 1 and 2 into an inoperative or compacted position as indicated in dash lines in FIG. 1 in which the outermost edge portion 3 of the cup-shaped reflector R is rearwardly inverted. This has the result that the depth or axial dimension of the inverted reflector is considerably reduced so that the reflector may easily be stored in a relatively flat casing or box in the cover of a casing. The flash bulb is indicated with 5 and is adapted to be inserted into a suitable axially arranged socket S.

FIG. 3 illustrates a photographic camera 8 for still pictures or motion pictures arranged in a protective casing or carrying case 6. The rear upper edge of the case 6 has hingedly secured thereon at 7 a box-shaped cover 9 to the inner bottom face of which is secured the central portion of a flexible cup-shaped reflector 10 with its flash bulb socket 11. The cover 9 is secured in its closed position by a push button lock 16 arranged on the front wall 19 of the cover. The front wall 14 of the case 6 is hingedly secured at 15 to the bottom wall 21 and has attached to its upper end a strap 17 carrying the push button of the lock 16. It will be noted that in the closed position of the cover 9 the flexible cup-shaped reflector 10 rests with its outer edge 13 on the top wall of the camera 8 and is axially compressed to a somewhat accordion-like shape.

When the cover 9 is opened and is tilted about the hinge 7 into a vertical position, as shown in dash lines, the reflector 10 owing to its flexibility will be axially extended into its operative position. The dash lines indicting this operative position of the reflector 10 show that the front marginal portion 18 of the reflector 10 extends with its edge 13 a substantial distance in front of the edge 12 of the open cover 9 so that the entire smooth inner surface of the reflector 10 is available for reflecting the light of the flash bulb 20 inserted in the socket 11.

What we claim is:

1. A flashgun comprising a camera carrying case having a cover pivotally attached to said camera carrying case and a unitary cup-shaped reflector made of rubber-elastic material mounted in said cover, said cover having a depth which is smaller than the axial dimension of said reflector in its extended operative position, said reflector being provided with a continuous smooth concave reflective surface and having such a wall thickness so as to be adapted to be axially distorted for decreasing its axial length for storage in the cover of said case.

2. A flashgun comprising a camera carrying case having a cover pivotally attached to said camera carrying case and a unitary cup-shaped reflector made of rubber-elastic material mounted in said cover, said cover having a depth which is smaller than the axial dimension of said reflector in its extended operative position, said reflector being provided with a continuous smooth concave reflective surface and having a substantially uniform wall thickness so as to be adapted to be axially distorted for decreasing its axial length for storage in the cover of said case.

References Cited by the Examiner
UNITED STATES PATENTS

| | | | |
|---|---|---|---|
| 1,603,055 | 10/1926 | Williams | 240—103 |
| 1,746,893 | 2/1930 | Homan | 240—52.2 X |
| 1,922,787 | 8/1933 | Touchman | 240—46.01 |
| 2,387,038 | 10/1945 | Owens | 240—103 |
| 2,681,870 | 6/1954 | Novak | 161—93 X |
| 2,804,541 | 8/1957 | Schotz | 240—10.66 |
| 2,806,135 | 9/1957 | Bolsey | 240—103 |
| 2,871,775 | 2/1959 | Van Der Mei | 95—11 X |
| 2,931,117 | 4/1960 | Bosworth et al. | |
| 3,170,172 | 2/1965 | Kessman. | |

FOREIGN PATENTS 75,172  6/1949  Norway.

NORTON ANSHER, *Primary Examiner.*
J. F. PETERS, *Assistant Examiner.*